US008638691B2

(12) United States Patent
Tanaka et al.

(10) Patent No.: US 8,638,691 B2
(45) Date of Patent: Jan. 28, 2014

(54) WIRELESS COMMUNICATION SYSTEM AND PARENT NODE SEARCH METHOD

(75) Inventors: Masato Tanaka, Tokyo (JP); Itsuki Tanabe, Tokyo (JP); Kuniyoshi Ueda, Tokyo (JP); Li Zheng, Tokyo (JP)

(73) Assignee: Azbil Corporation, Tokyo (JP)

( * ) Notice: Subject to any disclaimer, the term of this patent is extended or adjusted under 35 U.S.C. 154(b) by 116 days.

(21) Appl. No.: 13/258,016

(22) PCT Filed: Mar. 15, 2010

(86) PCT No.: PCT/JP2010/054359
§ 371 (c)(1),
(2), (4) Date: Sep. 21, 2011

(87) PCT Pub. No.: WO2010/110114
PCT Pub. Date: Sep. 30, 2010

(65) Prior Publication Data
US 2012/0020237 A1 Jan. 26, 2012

(30) Foreign Application Priority Data
Mar. 25, 2009 (JP) .................. 2009-073480

(51) Int. Cl.
*H04L 12/28* (2006.01)
(52) U.S. Cl.
USPC ............................ 370/254; 370/255; 370/256
(58) Field of Classification Search
USPC .................. 370/254, 255, 256, 311
See application file for complete search history.

(56) References Cited

U.S. PATENT DOCUMENTS

| 5,987,099 | A | 11/1999 | O'Neill et al. | |
|---|---|---|---|---|
| 8,081,583 | B2 * | 12/2011 | Ruy et al. ................ | 370/256 |
| 2006/0056329 | A1 | 3/2006 | Ookuma | |
| 2006/0215582 | A1 * | 9/2006 | Castagnoli et al. ........... | 370/254 |
| 2006/0215583 | A1 * | 9/2006 | Castagnoli .................... | 370/254 |
| 2009/0141666 | A1 * | 6/2009 | Jin et al. ....................... | 370/315 |
| 2009/0147699 | A1 * | 6/2009 | Ruy et al. ..................... | 370/254 |
| 2009/0147714 | A1 * | 6/2009 | Jain et al. ..................... | 370/311 |

FOREIGN PATENT DOCUMENTS

| CN | 1750494 A | 3/2006 |
|---|---|---|
| JP | H06-205459 A | 7/1994 |
| JP | 9-233218 A | 9/1997 |
| JP | 2000-152330 A | 5/2000 |
| JP | 2005-341341 A | 12/2005 |
| JP | 2006-295442 A | 10/2006 |
| JP | 2006-339762 A | 12/2006 |
| JP | 2006-345414 A | 12/2006 |
| JP | 2008-148032 A | 6/2008 |

OTHER PUBLICATIONS

PCT International Preliminary Report on Patentability for PCT/JP2010/054359 issued Oct. 18, 2011.
Japanese Office Action dated May 13, 2013, which issued during the prosecution of Japanese Patent Application No. 2009-073480.

* cited by examiner

*Primary Examiner* — Chuong T Ho
(74) *Attorney, Agent, or Firm* — Troutman Sanders LLP

(57) ABSTRACT

A parent node includes: a signal reception unit receiving a parent node search signal transmitted from a child node; a RSSI measurement unit measuring a RSSI as an index indicating the intensity of wireless link with the child node transmitting the parent node search signal; a response wait time standby processing unit that, after waiting for a response wait time in accordance with the intensity of wireless link, returns a response signal to the child node as a sender of the parent node search signal; and a signal transmission unit. The child node includes: a signal transmission unit transmitting a parent node search signal; a signal reception unit receiving a response signal; and a parent node selection unit that selects a parent node for routine communication on the basis of a wait time from the transmission of a parent node search signal to the reception of a response signal.

10 Claims, 7 Drawing Sheets

Background Art

Background Art

WIRELESS COMMUNICATION SYSTEM AND PARENT NODE SEARCH METHOD

CROSS REFERENCE TO PRIOR APPLICATIONS

This application is a U.S. National Phase application under 35 U.S.C. §371 of International Application No, PCT/JP2010/054359, filed on Mar. 15, 2010 and claims benefit of priority to Japanese Patent Application No, 2009-073480, filed on Mar. 25, 2009, The International Application was published in Japanese on Sep. 30, 2010 as WO 2010/110114 A1 under PCT Article 21(2), All these applications are herein incorporated by reference,

TECHNICAL FIELD

The present invention relates to a wireless communication system including a parent node as a host communication device and a child node as a subordinate communication device, and more particularly relates to a technique of allowing a child node to select a parent node for routine communication.

BACKGROUND ART

Some sensor devices such as a flowmeter and a thermo-hygrometer use a wireless communication function by radio waves instead of conventional wired connection for cost reduction with less wiring use and for monitoring and controlling from a remote place (see Patent Literature 1, for example). FIG. 8 is a block diagram illustrating a conventional wireless measurement system using such a wireless communication function. A typical wireless measurement system includes an information processing device 101 as a parent node such as a relay node or a gateway node and wireless communication devices 102 as end leaf nodes (child nodes). Data that is wireless-transmitted from the wireless communication devices 102 is stored in a database 103 via the information processing device 101.

The wireless communication devices 102 are nodes at ends of a network, and perform communication less frequently than the information processing device 101. Therefore, the wireless communication devices 102 have a feature of consuming less amount of electrical power than the information processing device 101. Further, the wireless measurement device requires removing not only a signal line but also a feeder line. Therefore the wireless communication device 102 often uses a battery as its power source. FIG. 9 illustrates specific examples of the wireless communication device 102. Example in FIG. 9A shows a sensor 104 and a battery-type wireless communication device 102a that are separately provided. Example in FIG. 9B shows a sensor-integrated battery type wireless communication device 102b including a sensor therein. In this way, the wireless communication device 102 often uses a battery as its power source. Accordingly, the wireless communication device 102 has a restriction on the operable time.

CITATION LIST

Patent Literatures

[Patent Literature 1] JP2008-148032 A

SUMMARY OF THE INVENTION

Technical Problem

In a system disclosed in Patent Literature 1, when there are a plurality of candidates for a parent node, upon transmitting a search signal from a leaf node to search for a communicable parent node, each parent node returns a response in response to this search signal. Then, the leaf node selects a parent node responding quickly and establishes a relationship for routine communication. When a direct connection with the parent node is disabled, the leaf node continues a communication with the parent node through an alternative path via another node without cancelling the relationship for routine communication with the parent node.

In the system disclosed in Patent Literature 1, since a parent node responding quickly is selected as a connection target of a leaf node, the operating time of the leaf node can be shortened, which must be advantageous for the battery life of the leaf node. In an actual field, however, a problem occurs that the battery life of a leaf node becomes shortened than expected. That is, the way of selection of a parent node as in the system disclosed in Patent Literature 1 with consideration given to quick response is not sufficient.

In order to cope with the above-stated problem, it is an object of the present invention to provide a wireless communication system and a parent node search method capable of reducing the possibility of making the battery life of a child node shorter than expected when the child node selects a parent node.

Solution to Problem

A wireless communication system of the present invention includes a parent node as a host communication device and a child node as a subordinate communication device. The parent node includes; parent node search signal receiving means that receives a parent node search signal transmitted from the child node; measurement means that measures, upon receiving the parent node search signal, an intensity of wireless link with the child node transmitting the parent node search signal; and response means that returns a response signal to the child node as a sender of the parent node search signal after waiting for a response wait time in accordance with the intensity of the wireless link. The child node includes: transmission means that transmits the parent node search signal; response signal reception means that receives the response signal; and parent node selection means that selects a parent node for routine communication with the child node in accordance with a wait time from transmission of the parent node search signal to reception of the response signal.

In one exemplary configuration of the wireless communication system of the present invention, the parent node further includes response wait time determination means that determines the response wait time in accordance with the intensity of the wireless link so that the response wait time becomes shorter with an increase in the intensity of the wireless link and the response wait time becomes longer with a decrease in the intensity of the wireless link, and the parent node selection means of the child node selects a parent node returning the response signal first.

In one exemplary configuration of the wireless communication system of the present invention, the response means of the parent node returns a response signal to the child node as a sender of the parent node search signal while minimizing the response wait time when the intensity of the wireless link is a threshold or higher, and finishes processing without returning the response signal when the wireless link is weaker than the threshold, and the parent node selection means of the child node selects a parent node returning the response signal first.

In one exemplary configuration of the wireless communication system of the present invention, the threshold is a specified value.

In one exemplary configuration of the wireless communication system of the present invention, the transmission means of the child node transmits the threshold together with the parent node search signal to the parent node, and the child node further includes threshold change means that, in the case of a failure in receiving a response signal from the parent node after transmission of the parent node search signal, changes the threshold to a value smaller than a current value and makes the transmission means retransmit the parent node search signal and the changed threshold.

In one exemplary configuration of the wireless communication system of the present invention, the measurement means measures a RSSI as an index indicating the intensity of the wireless link.

A parent node search method of the present invention includes the steps of: a transmission step where a child node as a subordinate communication device transmits a parent node search signal; a parent node search signal reception step where a parent node as a host communication device receives the parent node search signal transmitted from the child node; a measurement step where, when the parent node receives the parent node search signal, the parent node measures an intensity of wireless link with the child node transmitting the parent node search signal; a response step where the parent node returns a response signal to the child node as a sender of the parent node search signal after waiting for a response wait time in accordance with the intensity of the wireless link; a response signal reception step where the child node receives the response signal; and a parent node selection step where the child node selects a parent node for routine communication with the child node in accordance with a wait time from transmission of the parent node search signal to reception of the response signal.

Advantageous Effects of Invention

According to the present invention, when receiving a parent node search signal from a child node, a parent node measures an intensity of wireless link with the child node transmitting the parent node search signal, and after waiting for a response wait time in accordance with the intensity of the wireless link, the parent node returns a response signal to the child node as a sender of the parent node search signal. The child node selects a parent node for routine communication with the child node on the basis of a wait time from transmission of the parent node search signal to reception of the response signal. Thereby, the child node can select a parent node while considering communication stability. As a result, according to the present invention, the possibility of increasing retry for communication can be reduced, and the possibility of making the battery life of the child node shorter than expected can be reduced. Additionally, according to the present invention, the load on a child node for search processing can be reduced.

DESCRIPTION OF EMBODIMENTS

Principle 1 of the Invention

The present inventors have identified a factor of making the battery life of a child node shorter than expected as follows. That is, the factor resides in that when a parent node of unstable communication (parent node of weak link) is selected, a child node retries communication many times. When a child node sends a search signal for a communicable parent node, a parent node returns a response at any speed depending on the hardware without any specified rule. The present inventors have noted it effective to improve such a way of response.

Then, the present inventors have come up with the idea of changing a response wait time of a parent node in accordance with an intensity of link (Received Signal Strength indicator (RSSI: a numerical value indicating an intensity of a received signal)) with respect to a child node, more specifically of making a parent node with a larger link intensity respond more quickly and making a parent node with a smaller link intensity respond more slowly. Since a child node can tell the order of parent nodes for link intensity from the order of responses therefrom, the child node can select a parent node while considering the stability of communication. That is, a child node can select a parent node returning a response first. With this method, the load on a child node for search processing also can be reduced.

Principle 2 of the Invention

The present inventors further have come up with the idea of making a parent node with a threshold or higher of link intensity (RSSI) with respect to a child node return a response at a maximum speed, i.e., of making a parent node with a threshold or higher of link intensity return a response quickly. Since a child node can tell that parent nodes returning a response are nodes having a link intensity of a specified intensity or higher with respect to the child node and which one of the parent nodes can perform a communication therewith in the shortest time. Therefore, the child node can select a parent node while considering both the communication stability and the quick communication. That is, a child node can select a parent node returning a response first.

Embodiment 1

Figure 1:
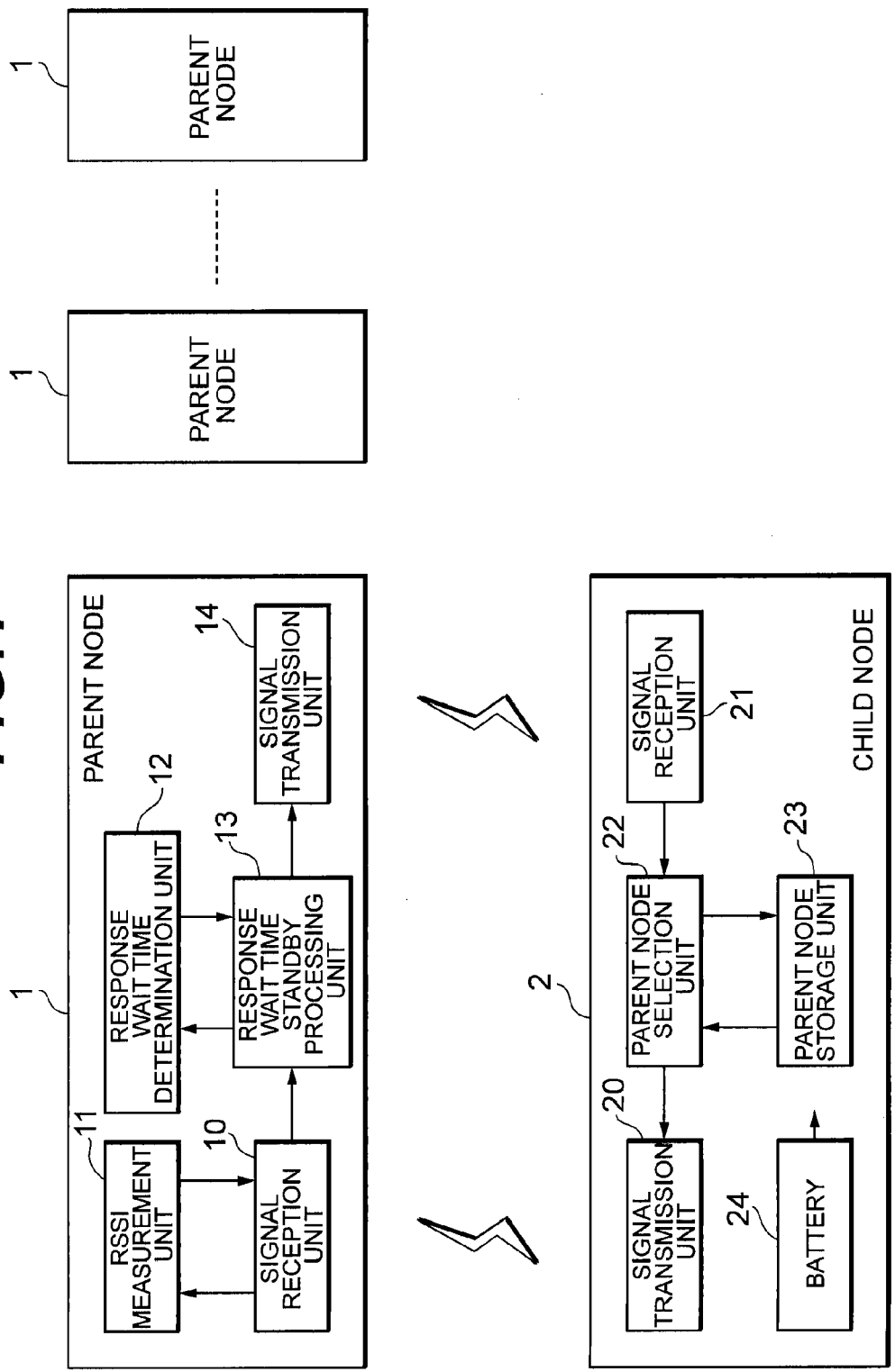
FIG. 1 is a block diagram illustrating the configuration of a wireless communication system according to Embodiment 1 of the present invention.

The following describes embodiments of the present invention with reference to the drawings. FIG. 1 is a block diagram illustrating the configuration of a wireless communication system according to Embodiment 1 of the present invention. The present embodiment is based on the aforementioned principle 1 of the invention.

The wireless communication system includes: a parent node 1 as a host communication device; and a child node (leaf node) 2 as a subordinate communication device such as a sensor device that transmits measurement data to the parent node 1.

The parent node 1 includes: a signal reception unit 10 that receives a signal from the child node 2 via wireless link; a RSSI measurement unit 11 that measures, when receiving a parent node search signal from a child node 2, a RSSI as an index indicating the intensity of wireless link with the child node 2 transmitting this parent node search signal; a response wait time determination unit 12 that determines a response wait time in accordance with the intensity of wireless link; a response wait time standby processing unit 13 that, after waiting for a response wait time in accordance with the intensity of wireless link, returns a response signal to the child node 2 as a sender of the parent node search signal; and a signal transmission unit 14 that transmits a signal to a child node 2 via wireless link. The response wait time standby processing unit 13 and the signal transmission unit 14 make up response means that returns a response signal.

The child node 2 includes: a signal transmission unit 20 that transmits a signal to a parent node 1 via wireless link; a signal reception unit 21 that receives a signal from a parent node 1 via wireless link; a parent node selection unit 22 that selects a parent node for routine communication with the child node on the basis of a wait time from the transmission of a parent node search signal to the reception of a response signal; a parent node storage unit 23 that stores an address of the parent node 1 selected by the parent node selection unit 22; and a battery 24 that supplies electrical power to the respective units of the child node 2.

When the child node 2 is a sensor device that measures the quantity of a state such as temperature, humidity or flow rate, the signal transmission unit 20 of the child node 2 acquires measurement data from a sensor unit not illustrated for each duty cycle, and transmits the acquired measurement data to a parent node 1 via wireless link.

Upon receiving data from the child node 2 via wireless link, the signal reception unit 10 of the parent node 1 stores the data in a database not illustrated. The data stored in the database is processed as needed. When the parent node 1 is a controller, for example, the parent node 1 performs temperature control, humidity control, flow-rate control or the like in accordance with the data (state quantity) received from the child node 2.

Figure 2:
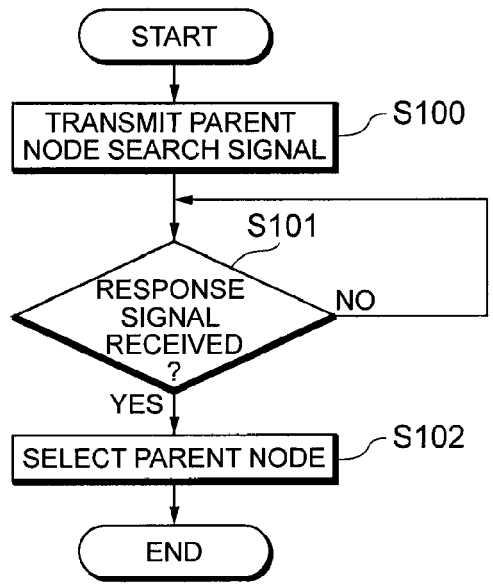
FIG. 2 is a flowchart illustrating an operation of a child node in a wireless communication system according to Embodiment 1 of the present invention.
Figure 3:
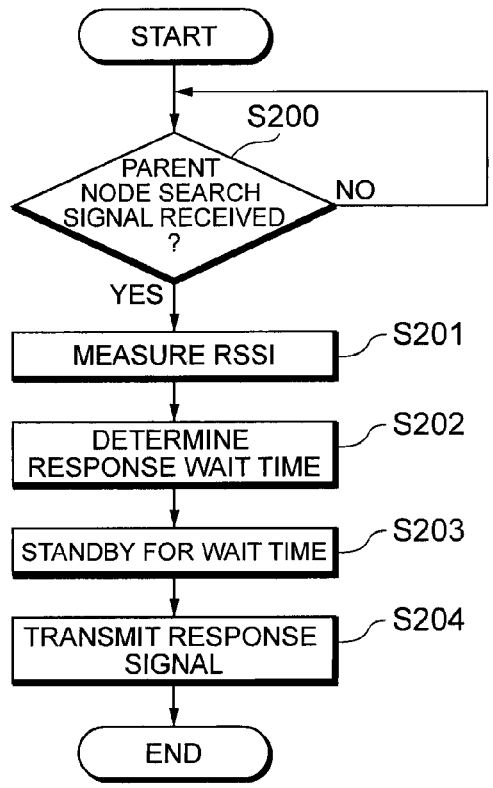
FIG. 3 is a flowchart illustrating an operation of a parent node in a wireless communication system according to Embodiment 1 of the present invention.

Next, parent node search processing by the child node 2 is described below. FIG. 2 is a flowchart illustrating an operation of the child node 2, and FIG. 3 is a flowchart illustrating an operation of the parent node 1.

Firstly, the parent node selection unit 22 of the child node 2 trying to search for a parent node 1 for routine communication makes the signal transmission unit 20 wireless-transmit a parent node search signal (Step S100 of FIG. 2). At this time, since the child node 2 wants to search for a parent node 1 of stable communication among a plurality of parent nodes 1, the child node 2 multicast-transmits the parent node search signal to all of the parent nodes 1.

Upon receiving the parent node search signal from the child node 2 (YES at Step S200 of FIG. 3), the signal reception unit 10 of each parent node 1 passes this parent node search signal to the RSSI measurement unit 11. The RSSI measurement unit 11 measures the intensity of the parent node search signal to measure a RSSI (Step S201). This RSSI represents the intensity of wireless link with the child node 2 transmitting the parent node search signal.

The response wait time determination unit 12 of the parent node 1 includes a relationship between RSSI and response wait time that is registered beforehand. This relationship is configured as in inverse proportion so that a response wait time becomes shorter with an increase in the intensity of RSSI and a response wait time becomes longer with a decrease in the intensity of RSSI. On the basis of this relationship registered beforehand, the response wait time determination unit 12 determines a response wait time in accordance with the RSSI (Step S202).

After waiting for the determined response wait time (Step S203), the response wait time standby processing unit 13 instructs the signal transmission unit 14 to transmit a response signal. In response to this instruction, the signal transmission unit 14 wireless-transmits a response signal to the child node 2 as the sender of the parent node search signal (Step S204). Since the parent node search signal transmitted from the child node 2 includes the address of the child node 2 as a sender address attached thereto, the signal transmission unit 14 can transmit the response signal to the child node 2 having this sender address.

Each parent node 1 receiving a parent node search signal performs processing like that.

Next, upon receiving a response signal from each parent node 1 (YES at Step S101 of FIG. 2), the signal reception unit 21 of the child node 2 passes this response signal to the parent node selection unit 22. The parent node selection unit 22 selects a parent node 1 for routine communication therewith on the basis of a wait time from the transmission of the parent node search signal to the reception of the response signal (Step S102). The parent node selection unit 22 selects a parent node 1 with the shortest wait time, i.e., a parent node 1 that returns a response signal first, and stores the sender address included in the response signal returned from this parent node 1 in the parent node storage unit 23. Thus, a relationship for routine communication is established between the selected parent node 1 and the child node 2.

Thereafter, the signal transmission unit 20 of the child node 2 will transmit measurement data to the parent node 1 establishing the relationship for routine communication.

In the present embodiment, the child node 2 can select a parent node 1 while considering the communication stability. As a result, according to the present embodiment, the possibility of increasing retry for communication can be reduced, and the possibility of making the battery life of the child node shorter than expected can be reduced.

Note that the processing of FIG. 2 and FIG. 3 may be performed not only once but also regularly. Thereby, an appropriate parent node can be selected in accordance with the latest communication state.

Embodiment 2

Figure 4:
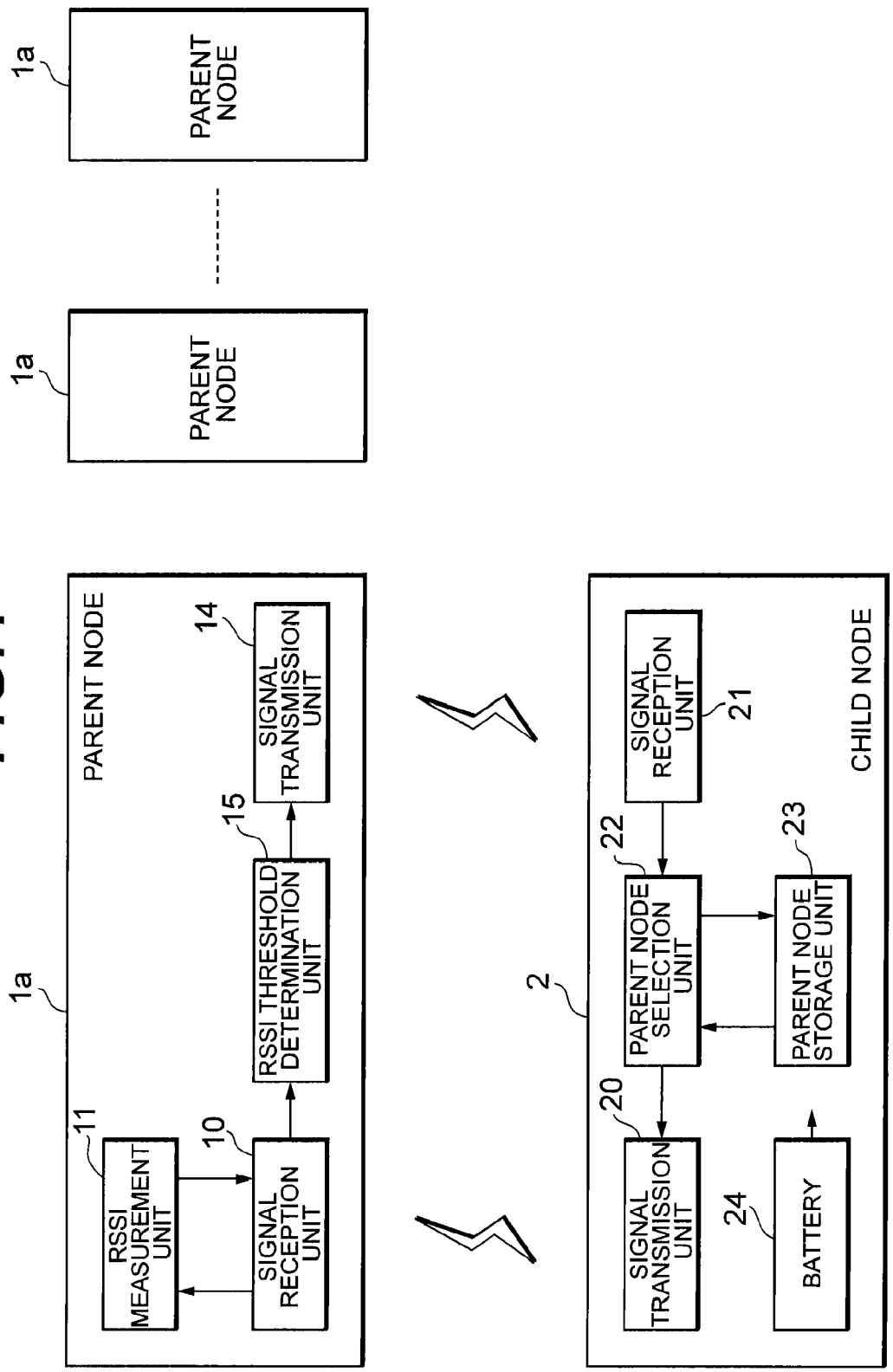
FIG. 4 is a block diagram illustrating the configuration of a wireless communication system according to Embodiment 2 of the present invention.

The following describes Embodiment 2 of the present invention. FIG. 4 is a block diagram illustrating the configuration of a wireless communication system according to Embodiment 2 of the present invention. The same reference numerals are assigned to the same elements as in FIG. 1. The present embodiment is based on the aforementioned principle 2 of the invention.

The wireless communication system of the present embodiment includes: a parent node 1a and a child node 2.

The parent node 1a includes: a signal reception unit 10; a RSSI measurement unit 11; a signal transmission unit 14; and a RSSI threshold determination unit 15 that, when the intensity of wireless link is a threshold or higher, returns a response signal to a child node 2 as a sender of a parent node search signal while minimizing a response wait time, and when the wireless link is weaker than the threshold, finishes processing without returning the response signal. In the present embodiment, the signal transmission unit 14 and the RSSI threshold determination unit 15 make up response means. The child node 2 is configured in the same way as in Embodiment 1.

Figure 5:
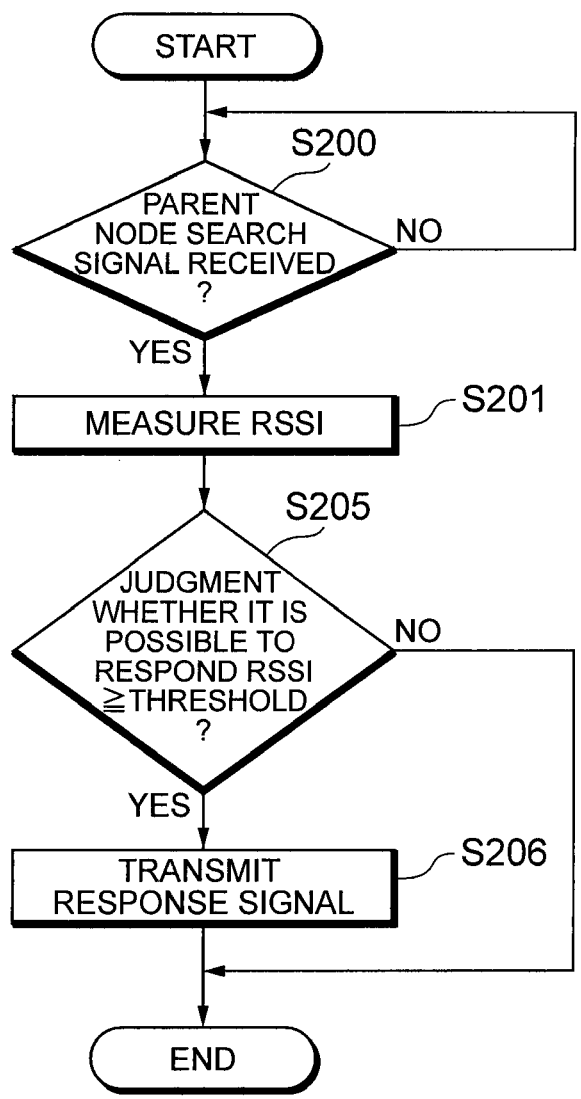
FIG. 5 is a flowchart illustrating an operation of a parent node in a wireless communication system according to Embodiment 2 of the present invention.

The following describes parent node search processing by the child node 2. FIG. 5 is a flowchart illustrating an operation of the parent node 1a.

As described in Embodiment 1, the child node 2 trying to search for a parent node 1a for routine communication transmits a parent node search signal (Step S100 of FIG. 2).

Similarly to Embodiment 1, upon receiving the parent node search signal from the child node 2 (YES at Step S200 of FIG. 5), the signal reception unit 10 of each parent node 1a passes this parent node search signal to the RSSI measurement unit 11.

The RSSI measurement unit 11 measures the intensity of the parent node search signal to measure a RSSI (Step S201).

The RSSI threshold determination unit 15 of the parent node 1a compares the RSSI measured by the RSSI measurement unit 11 with a threshold specified beforehand, and only when the RSSI is the threshold or higher (YES at Step S205), the RSSI threshold determination unit 15 instructs the signal transmission unit 14 to transmit a response signal. In response to this instruction, the signal transmission unit 14 wirelessly transmits a response signal to the child node 2 as the sender of the parent node search signal (Step S206). This processing at Step S206 corresponds to returning of a response signal while minimizing a response wait time (setting at 0) in Embodiment 1.

The child node 2 receiving the response signal from each parent node 1a operates as described in Embodiment 1.

In this way, the present embodiment can achieve the same effect as that in Embodiment 1. Note here that similarly to Embodiment 1, the processing of FIG. 2 and FIG. 5 may be performed not only once but also regularly.

Embodiment 3

Figure 6:
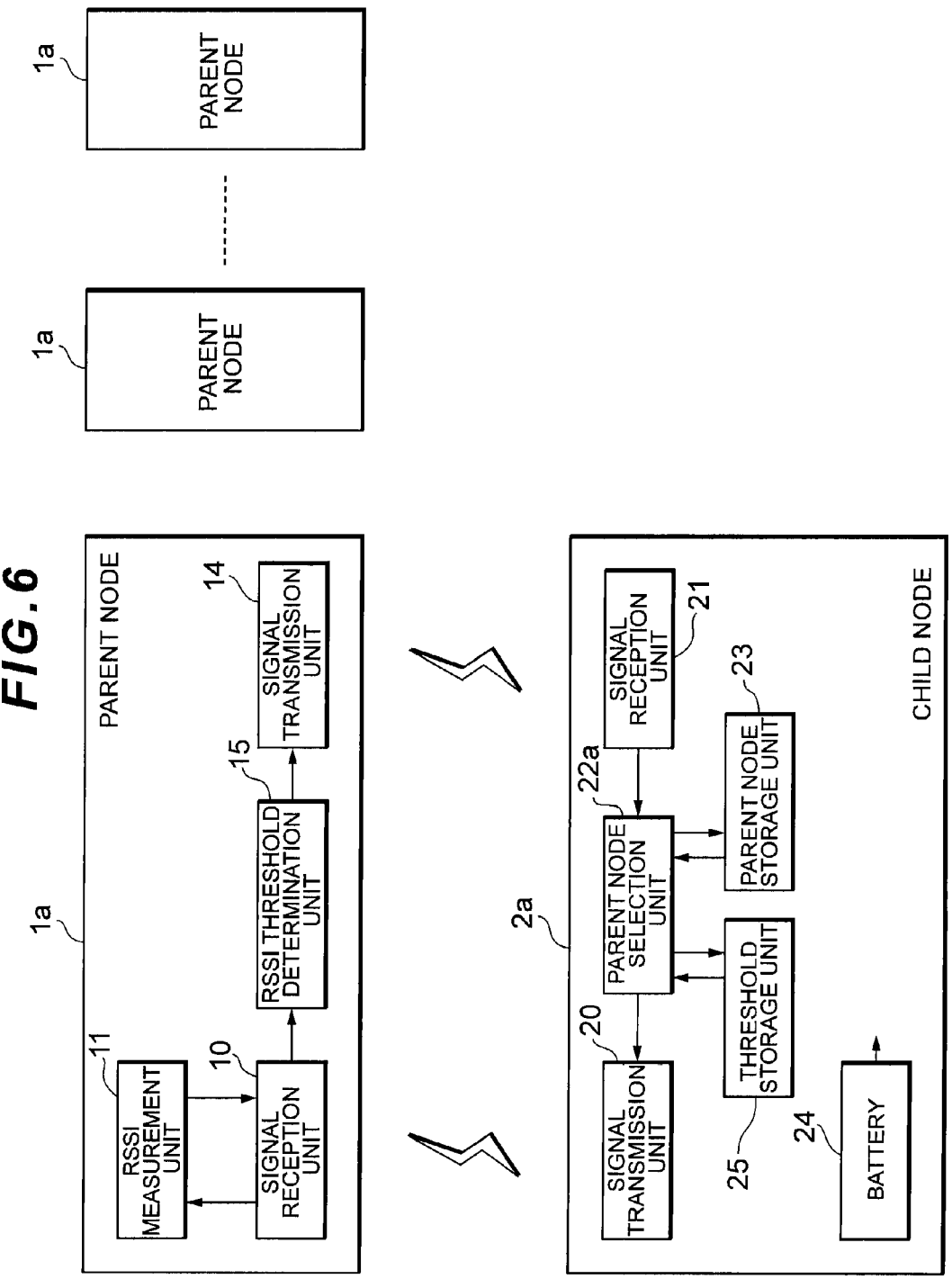
FIG. 6 is a block diagram illustrating the configuration of a wireless communication system according to Embodiment 3 of the present invention.

The following describes Embodiment 3 of the present invention. In Embodiment 2, the threshold used for comparison with RSSIs is specified beforehand. The threshold, however, may be transmitted from a child node to a parent node. FIG. 6 is a block diagram illustrating the configuration of a wireless communication system according to Embodiment 3 of the present invention. The same reference numerals are assigned to the same elements as in FIG. 1 and FIG. 4.

The wireless communication system of the present embodiment includes: a parent node 1a and a child node 2a.

The parent node 1a is configured in the same way as in Embodiment 2. The child node 2a includes: a signal transmission unit 20a; a signal reception unit 21; a parent node selection unit 22a; a parent node storage unit 23; a battery 24; and a threshold storage unit 25 that stores a current value of a threshold used for comparison with a RSSI. The parent node selection unit 22a and the threshold storage unit 25 make up threshold change means.

Figure 7:
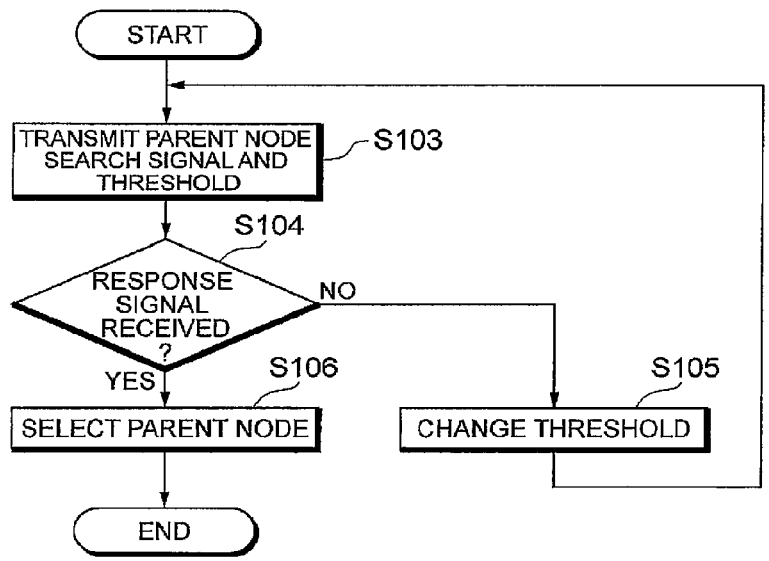
FIG. 7 is a flowchart illustrating an operation of a child node in a wireless communication system according to Embodiment 3 of the present invention.
Figure 8:
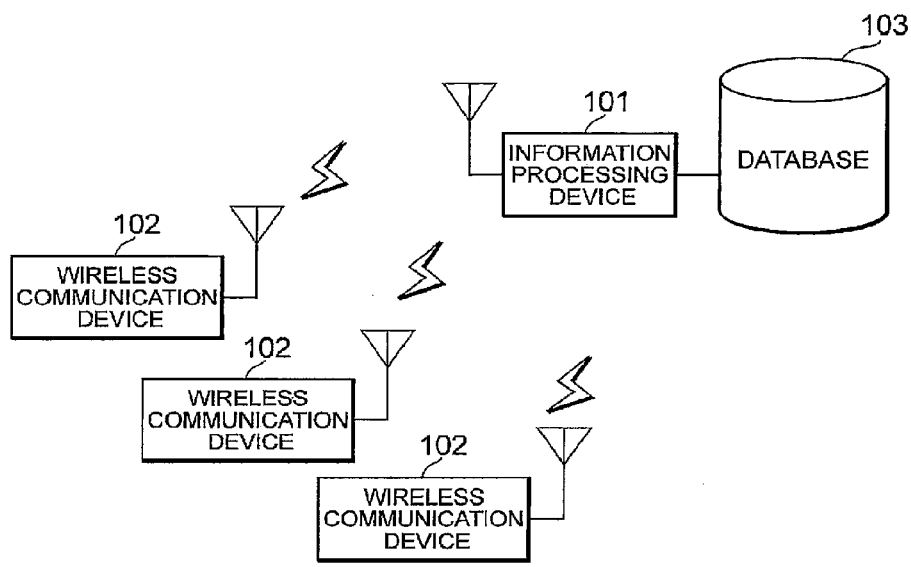
FIG. 8 is a block diagram illustrating the configuration of a conventional wireless measurement system.
Figure 9A:
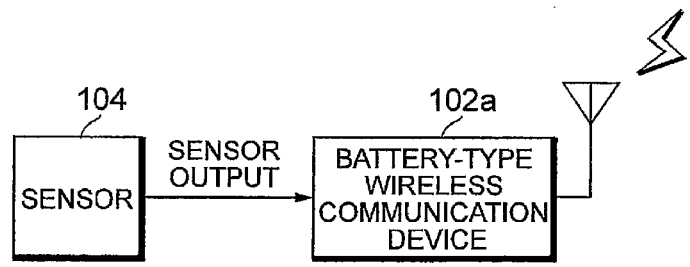
FIG. 9 illustrates specific examples of a wireless communication device in the wireless measurement system of FIG. 8.
Figure 9B:
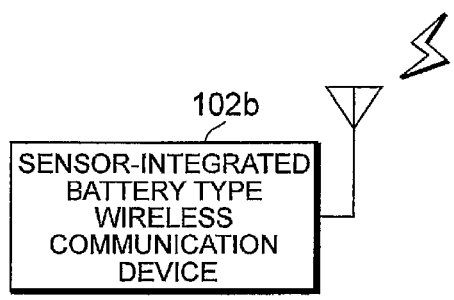

The following describes parent node search processing by the child node 2a. FIG. 7 is a flowchart illustrating an operation of the child node 2a.

The parent node selection unit 22a of the child node 2a makes the signal transmission unit 20a transmit a parent node search signal and a threshold stored in the threshold storage unit 25 (Step S103 of FIG. 7).

The parent node 1a receiving the parent node search signal and the threshold operates in the same way as in Embodiment 2. The RSSI threshold determination unit 15 of the parent node 1a may use the threshold that the signal reception unit 10 receives for the determination at Step S205.

Next, when the parent node selection unit 22a of the child node 2a fails to receive a response signal from the parent node 1a (NO at Step S104), the parent node selection unit 22a determines that the threshold is too high and decreases the threshold stored in the threshold storage unit 25 by a predetermined change width (Step S105), and then the procedure returns to Step S103.

In this way, the processing from Step S103 to Step S105 is repeated until a response signal can be received from at least one parent node 1a.

When a response signal can be received from at least one parent node 1a (YES at Step S104), the parent node selection unit 22a selects a parent node 1a for routine communication therewith (Step S106). The processing at Step S106 is the same as at Step S102 of FIG. 2.

Similarly to Embodiment 1, the processing of FIG. 5 and FIG. 7 may be performed not only once but also regularly. In this case, the parent node selection unit 22a may return the threshold to an initial value at the time when selection for a parent node is completed.

The configuration except for the signal reception unit 10 and the signal transmission unit 14 of the parent node 1, 1a of Embodiments 1 to 3 may be implemented by a computer including a CPU, a storage device and an interface and a program that controls these hardware resources. The CPU of the parent node 1, 1a executes processing described in Embodiments 1 to 3 in accordance with the program stored in the storage device.

Similarly, the configuration except for the signal transmission unit 20, 20a, the signal reception unit 21 and the battery 24 of the child node 2, 2a of Embodiments 1 to 3 may be implemented by a computer including a CPU and a storage device and a program that controls these hardware resources. The CPU of the child node 2, 2a executes processing described in Embodiments 1 to 3 in accordance with the program stored in the storage device.

INDUSTRIAL APPLICABILITY

The present invention is applicable to a technique of allowing a child node to select a parent node in a wireless communication system.

REFERENCE SIGNS LIST 1, 1a . . . parent node, 2, 2a . . . child node, 10 . . . signal reception unit, 11 . . . RSSI measurement unit, 12 . . . response wait time determination unit, 13 . . . response wait time standby processing unit, 14 . . . signal transmission unit, 15 . . . RSSI threshold determination unit, 20, 20a . . . signal transmission unit, 21 . . . signal reception unit, 22, 22a . . . parent node selection unit, 23 . . . parent node storage unit, 24 . . . battery, 25 . . . threshold storage unit

The invention claimed is:

1. A wireless communication system comprising a parent node as a host communication device and a child node as a subordinate communication device,
wherein the parent node includes:
a parent node search signal receiver receiving a parent node search signal transmitted from the child node;

a measurement device measuring, upon receiving the parent node search signal, an intensity of wireless link with the child node transmitting the parent node search signal;

a responder returning a response signal to the child node as a sender of the parent node search signal after waiting for a response wait time in accordance with the intensity of the wireless link; and a response wait time determination device determining the response wait time in accordance with the intensity of the wireless link so that the response wait time becomes shorter with an increase in the intensity of the wireless link and the response wait time becomes longer with a decrease in the intensity of the wireless link, wherein the child node includes:

a transmitter transmitting the parent node search signal;

a response signal receiver receiving the response signal; and a parent node selector selecting a parent node for routine communication with the child node in accordance with a wait time from transmission of the parent node search signal to reception of the response signal, and wherein the parent node selector of the child node selects a parent node returning the response signal first.

2. The wireless communication system according to claim 1, wherein the responder of the parent node returns a response signal to the child node as a sender of the parent node search signal while minimizing the response wait time when the intensity of the wireless link is a threshold or higher, and finishes processing without returning the response signal when the wireless link is weaker than the threshold, and the parent node selector of the child node selects a parent node returning the response signal first.

3. The wireless communication system according to claim 2, wherein the threshold is a specified value.

4. The wireless communication system according to claim 2, wherein the transmitter of the child node transmits the threshold together with the parent node search signal to the parent node, and the child node further comprises a threshold change device that, in the case of a failure in receiving a response signal from the parent node after transmission of the parent node search signal, changes the threshold to a value smaller than a current value and makes the transmitter retransmit the parent node search signal and the changed threshold.

5. The wireless communication system according to claim 1, wherein the measurement device measures a RSSI as an index indicating the intensity of the wireless link.

6. A parent node search method, comprising the steps of:

a transmission step where a child node as a subordinate communication device transmits a parent node search signal;

a parent node search signal reception step where a parent node as a host communication device receives the parent node search signal transmitted from the child node;

a measurement step where, when the parent node receives the parent node search signal, the parent node measures an intensity of wireless link with the child node transmitting the parent node search signal;

a response wait time determination step where the parent node determines a response wait time in accordance with the intensity of the wireless link so that the response wait time becomes shorter with an increase in the intensity of the wireless link and the response wait time becomes longer with a decrease in the intensity of the wireless link;

a response step where the parent node returns a response signal to the child node as a sender of the parent node search signal after waiting for a response wait time in accordance with the intensity of the wireless link;

a response signal reception step where the child node receives the response signal; and a parent node selection step where the child node selects a parent node for routine communication with the child node in accordance with a wait time from transmission of the parent node search signal to reception of the response signal and where the child node selects a parent node returning the response signal first.

7. The parent node search method according to claim 6, wherein in the response step, a response signal is returned to the child node as a sender of the parent node search signal while minimizing the response wait time when the intensity of the wireless link is a threshold or higher, and processing is finished without returning the response signal when the wireless link is weaker than the threshold, and in the selection step, the child node selects a parent node returning the response signal first.

8. The parent node search method according to claim 7, wherein the threshold is a specified value.

9. The parent node search method according to claim 7, wherein in the transmission step, the threshold together with the parent node search signal are transmitted to the parent node, wherein the parent node search method further comprises a threshold change step where, in the case of a failure in receiving a response signal from the parent node after transmission of the parent node search signal, the child node changes the threshold to a value smaller than a current value and retransmits the parent node search signal and the changed threshold.

10. The parent node search method according to claim 6, wherein in the measurement step, a RSSI is measured as an index indicating the intensity of the wireless link.

* * * * *